(12) United States Patent
Nicholas et al.

(10) Patent No.: US 6,423,933 B2
(45) Date of Patent: Jul. 23, 2002

(54) PROCESS AND APPARATUS FOR WEAKENING AN AUTOMOTIVE TRIM PIECE FOR AN AIRBAG DEPLOYMENT OPENING

(75) Inventors: Antonios Nicholas, Belle Mead, NJ (US); Michael Towler, Farmington, MI (US)

(73) Assignee: TIP Engineering Group, Inc., Farmington Hills, MI (US)

( * ) Notice: Subject to any disclaimer, the term of this patent is extended or adjusted under 35 U.S.C. 154(b) by 0 days.

(21) Appl. No.: 09/811,152

(22) Filed: Mar. 16, 2001

Related U.S. Application Data
(60) Provisional application No. 60/190,719, filed on Mar. 17, 2000.

(51) Int. Cl.[7] .............................................. B23K 26/02
(52) U.S. Cl. .............................. 219/121.7; 219/121.62; 219/121.69
(58) Field of Search ........................... 219/121.7, 121.6, 219/121.61, 121.62, 121.68, 121.69, 121.78, 121.82, 121.83, 121.85, 121.76, 121.71; 264/400, 272.8, 743.1; 280/728.3, 731, 732

(56) References Cited

U.S. PATENT DOCUMENTS

| | | | | |
|---|---|---|---|---|
| 5,744,776 A | * | 4/1998 | Bauer | 219/121.7 |
| 5,883,356 A | * | 3/1999 | Bauer et al. | 219/121.62 |
| 5,979,931 A | * | 11/1999 | Totani et al. | 280/728.3 |
| 6,139,049 A | * | 10/2000 | Gallagher | 219/121.69 |
| 6,294,124 B1 | * | 9/2001 | Bauer et al. | 219/121.7 |
| 6,337,461 B1 | * | 1/2002 | Yasuda et al. | 219/121.62 |

* cited by examiner

Primary Examiner—Tom Dunn
Assistant Examiner—Jonathan Johnson
(74) Attorney, Agent, or Firm—John R. Benefiel

(57) ABSTRACT

A method and apparatus is disclosed for forming lines of weakness in an automotive trim piece so as to enable formation of an airbag deployment opening in the trim piece. A cutting beam, such as a laser is directed at the trim piece surface to be scored and a sensor emits a sensing beam, and a beam combining device receives both the sensor beam and the laser beam and causes downstream beam segments to be collinear with each other as they impinge the trim piece surface. The scoring is thereby able to be carried out in a single pass, and is precise, repeatable and independent of cutting depth, angle of cutting, scoring patterns, material inconsistency, material color, and surface grain variability.

19 Claims, 4 Drawing Sheets

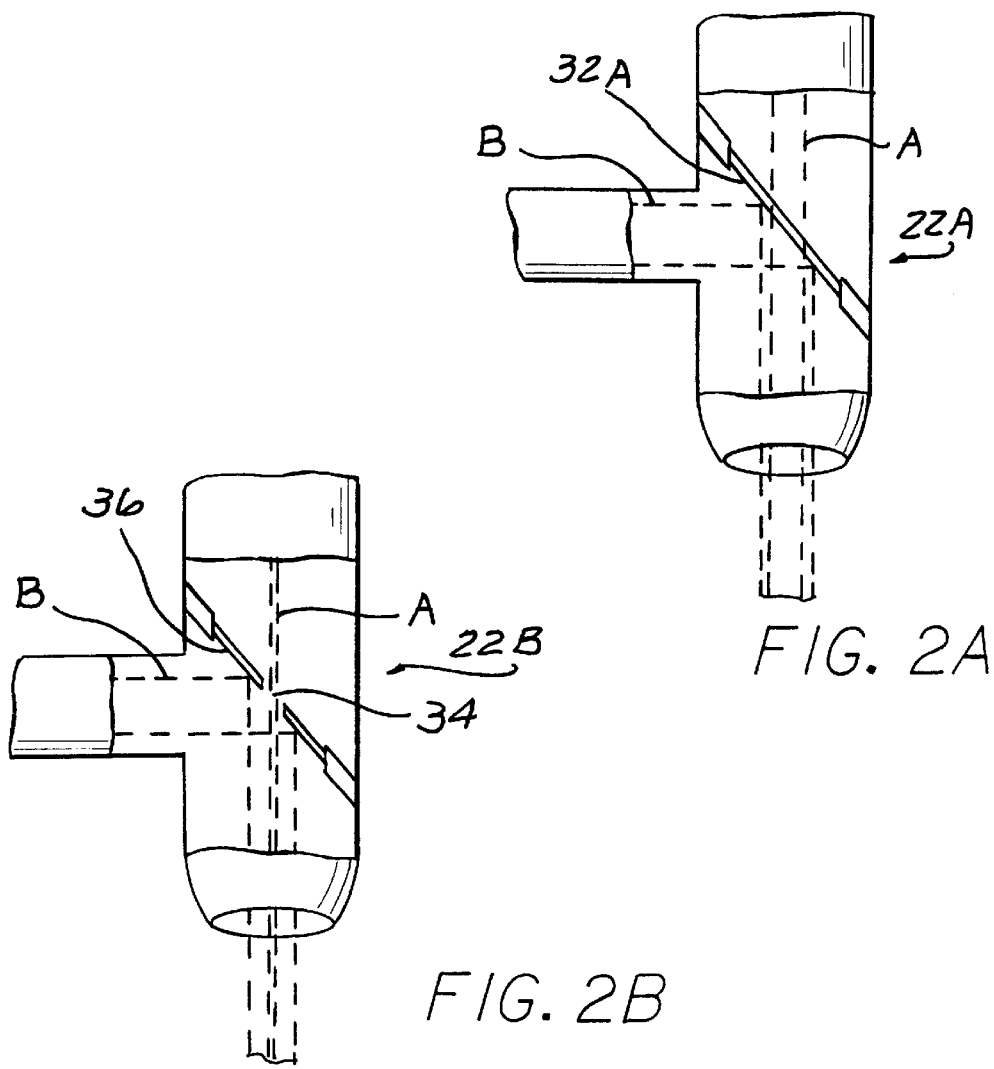
FIG. 2A
FIG. 2B
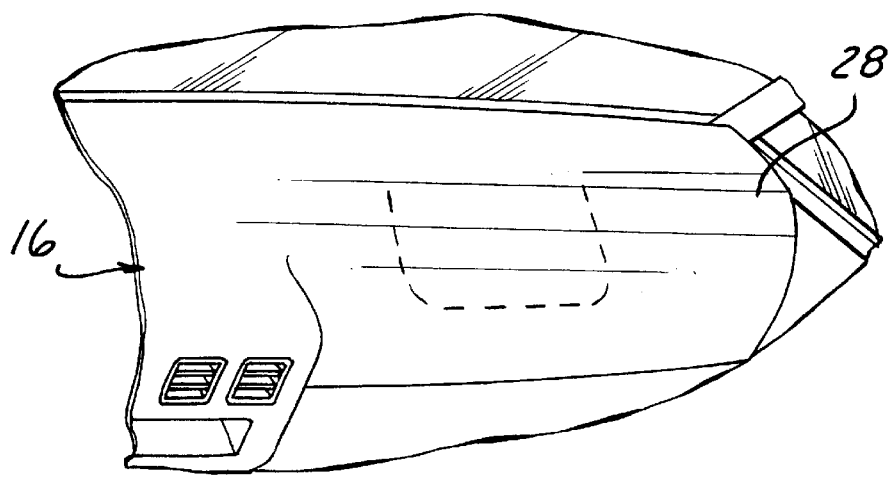
FIG. 3

PROCESS AND APPARATUS FOR WEAKENING AN AUTOMOTIVE TRIM PIECE FOR AN AIRBAG DEPLOYMENT OPENING

CROSS REFERENCE TO RELATED APPLICATIONS

This application claims the benefit of U.S. provisional Serial No. 60/190,719, filed Mar. 17, 2000.

BACKGROUND OF THE INVENTION

This invention concerns forming lines of weakness in portions of automotive trim pieces overlying airbag safety devices, in order to allow one or more airbag deployment doors to be created when an airbag is inflated.

Airbag safety systems are widely used in automotive vehicles and generally comprise an inflatable cushion, referred to as an "airbag", stored folded in a receptacle and then rapidly inflated when a collision of the vehicle is detected by sensors.

The folded airbag is typically mounted behind an automotive interior trim piece such as an instrument panel or a steering wheel cover. One or more airbag deployment doors are forced open when the airbag is inflated to allow deployment of the airbag through the opening created by the deployment door movement.

During the last few years, airbag deployment doors that are integrated into the trim piece overlying the airbag receptacle have gained wide acceptance. As described in U.S. Pat. Nos. 5,082,310 and 5,744,776, these integrated doors employ a seamless or invisible construction whereby the deployment door or doors, although part of the trim piece, are not separately delineated and/or visible from the passenger side of the trim piece.

For such integrated deployment doors to open during airbag deployment necessitates weakening portions of the trim piece in order to allow trim piece sections to break free and hinge open. Weakening of the trim piece is carried out by creative lines of weakness comprised of scored lines formed by removing material from the trim piece from the back surface along a predetermined deployment door pattern. A critical component of this process is the amount of the trim piece material removed and/or remaining after cutting the score line. Accurate control of this process is critical to reliably producing proper airbag deployments.

A widely used method for determining the extent of material removal during scoring involves the use of triangulation type sensors as described in U.S. Pat. No. 5,883,356. These sensors, however, due to their triangulation operating principle, are limited in their ability to reach the bottom of the scoring produced by the cutting device. This is particularly so for narrow, deep penetrations which may be imparted by cutting devices such as lasers and cutting knives. Furthermore, due to their offset mounting, these sensors are not well suited to measure the varying penetration depth that occurs during scoring at a specific location. This is especially true if the scoring penetration is in the form of partial perforations or slots. As such, the process does not lend itself to scoring the trim piece in an adaptive control mode, where both depth sensing and scoring are in registry with each other to impinge the same point on the trim piece, during the progression of scoring of the trim piece.

Accordingly it is an object of this invention to provide a process and apparatus for scoring trim components overlying airbag installations in a manner that provides accurate adaptive process control, single-pass processing, improved airbag door deployment, and lower manufacturing costs.

SUMMARY OF THE INVENTION

According to the invention, the scoring of the trim piece is accomplished by the use of a controllable cutting means, such as a laser beam, which, based on feedback from two sensors, is controlled in intensity together with controlled relative movement between the laser and the trim piece, producing a precise, predetermined penetration into the trim piece along a predetermined pattern.

In this process, the laser cutting beam and sensing beam emitted from a first sensor are both directed at a surface on one side of the trim piece. A second sensor may also be positioned on the opposite side of the trim piece in opposition to the cutting laser beam. A beam combining device combines the laser cutting and sensing beams together so as to have collinear segments directed at exactly the same point on the trim piece. The scoring of the trim piece is carried out by the laser beam while the trim piece is moved in a predetermined pattern relative to the laser to form one or more deployment doors defined by the sections of the trim piece within the pattern. The depth of scoring of the trim piece by the laser beam is controlled by real time feedback signals corresponding to the depth of the cut provided by the first sensor. To determine material thickness remaining during scoring of each point along the predetermined pattern, real time feedback from the second sensor can be provided combined with the feedback signals from the first sensor. The sensor feedback can also be utilized to control the movement of the trim piece relative to the laser beam to enhance the weakening process control.

This process, due to the collinear arrangement of the impinging segments of the sensor and cutting beams, affords several advantages, including single-pass adaptive processing, scoring precision and superior part to part repeatability. The process is also independent of cutting depth, angle of cutting, scoring patterns, material inconsistency, material color, and surface grain variations.

Relative motion between the trim piece and the cutting beam to score the trim piece in a predetermined pattern can be provided by different means, including robots and X-Y tables.

The trim piece can have a monolayer, multilayer, or composite construction and could be scored on either side. The scoring can be continuous, intermittent or be a combination of both, and extend completely through one or more layers of the trim piece. The trim piece can be a finished part or a component which is subsequently integrated into a finished part.

DESCRIPTION OF THE DRAWINGS

FIGS. 2, 2A and 2B are fragmentary enlarged views of several alternative designs of the beam combining device incorporated in the apparatus shown in FIG. 1.

FIG. 3 is an automotive instrument panel with an integrated airbag deployment door formed by in a U pattern scoring carried out by the apparatus and process of the present invention.

DETAILED DESCRIPTION

In the following detailed description, certain specific terminology will be employed for the sake of clarity and particular embodiments described, but it is to be understood that the same is not intended to be limiting and should not be so construed inasmuch as the invention is capable of taking many forms and variations within the scope of the appended claims.

This invention describes an improved process and apparatus for forming lines of weakness in an automotive trim piece for an airbag door installation in a way that improves the accuracy of the process, the trim piece quality, the airbag deployment performance, and, also, reduces trim piece production costs. The process will be described with respect to an instrument panel airbag door installation, but it is also applicable to other automotive and non-automotive installations, with or without an airbag. Typical airbag installations include driver side airbags, front passenger airbags, side impact airbags, headliner airbags, knee airbags, and rear passenger airbags. The process will also be described in terms of a laser beam, but is also applicable to other cutting beams as described below.

Figure 1:
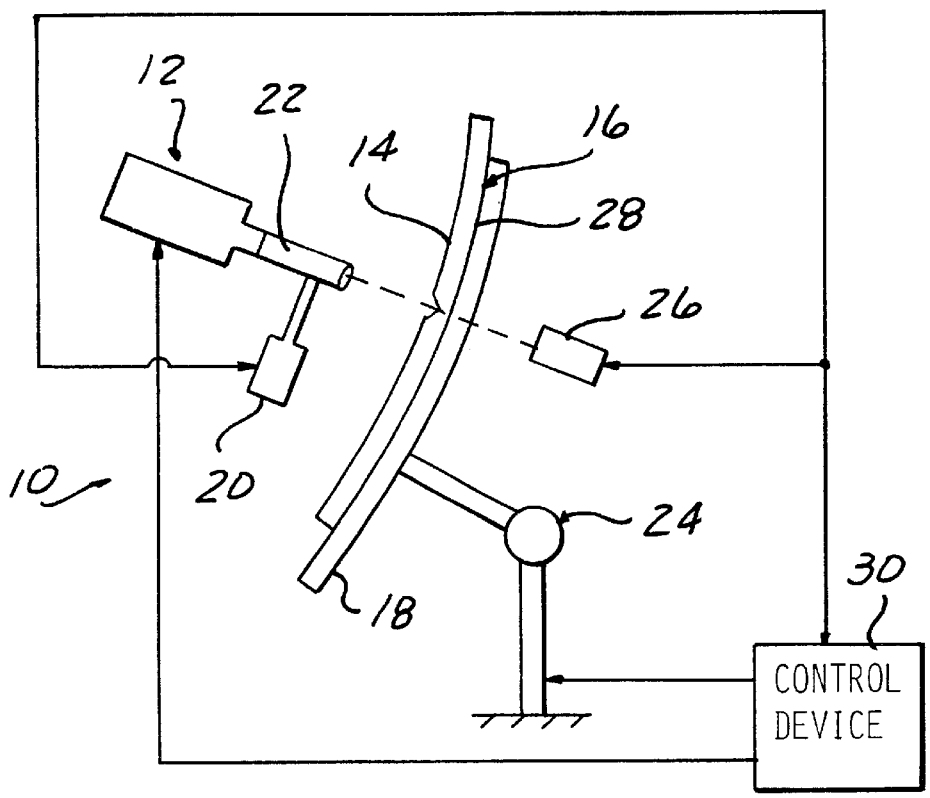
FIG. 1 is a diagrammatic view of one form of the apparatus according to the invention including two sensors.

FIG. 1 shows a first embodiment of a trim piece scorning apparatus 10 according to the invention. This includes a cutting beam source 12 which generates a cutting beam such as a laser beam which is used to carry out controlled scoring of a surface 14 on one side of an instrument panel trim piece 16 that would overlie an airbag installation when installed.

The trim piece 16 is positioned on a fixture 18. A first sensor 20 is provided to determine the depth of scoring produced by the laser cutting beam onto the surface 14 of the trim piece 16 to weaken the same. The first sensor 20 and the cutting beam generator 12 are connected to a beam combining device 22. The beam combining device 22 (shown in detail in FIG. 2) is designed to combine the separately generated sensing beam or beams A emanating from the first sensor 20 and the laser cutting beam B from source 12 so as to be in a collinear relationship and to direct the combined segments of the sensor A and cutting beam B so as to impinge the same precise spot on the trim piece surface 14. This beam combining device 22 will also redirect any reflected beam or beams required for sensor operation from the trim piece surface 14 back to the first sensor 20 as necessary in carrying out the process.

The trim piece 16 is moved relative to the cutting laser beam source 12, as well as the first sensor 20 and the beam combining device 22 via a motion actuator 24 to cause tracing of a particular scoring pattern and to achieve a precisely controlled rate of scoring. The motion actuator 24 can directly move the trim piece 16 itself or move an optional fixture 18 onto which the trim piece 16 is mounted. Alternatively, the motion actuator 24 could be used to move the laser beam source 12 and the first sensor 20 relative to the trim piece 16.

A second sensor 26 may be located on the side of the trim piece 16 opposite the first sensor 20, a second sensor beam emanating therefrom, directed at the outer surface 28 of the trim piece 16 and aligned opposite the same trim piece point as is the laser cutting beam and the first sensor beam or beams are directed in order to control the scoring so as to produce a programmed thickness of material remaining after scoring. This is done by combining signals generated by both sensors 20, 26 to create a feedback signal corresponding to the thickness of the remaining material.

The apparatus 10 is operated via one or more industrial controllers 30 that control the scoring effected by the laser and/or the movement of the motion actuator based on a particular program and feedback signals provided by the sensor 20, 26.

Lasers are particularly desirable for carrying out this type of scoring processes and they can be of the carbon dioxide, excimer, solid state, argon gas, or diode type. However, based on the primary trim piece materials utilized (polymers, fabrics, wood, leather), the carbon dioxide laser is likely to be the most preferable in terms of operability, efficiency and cost. The laser can be operated either continuously or in a pulsed mode.

Different type of sensors can be utilized to measure the extent of material removed or remaining during scoring of the trim piece. For the first sensor 20, connected to the beam combining device 22, a preferred type is a closed loop device that sends and receives a specific beam of electromagnetic radiation in order to determine the depth of scoring effected by the laser. The Conoprobe sensors offered by Optimet and based on the technique of conoscopic holography, is one such sensor commercially available. In this type of sensor, an emitted laser beam and reflected return beams of visible light have segments also traveling in a collinear relationship with each other and the laser beam. Another type of sensor that could be utilized is one that detects reflected light beams such as a high speed CCD camera. In this application, the reflected beam will be reflected from the trim piece surface being scored by the cutting beam.

For the second sensor 26 aimed at the outside surface of the trim piece, which is generally smooth and accessible, there are more numerous options including, infrared, laser, ultrasonic, conoscopic, CCD camera, proximity and contact type sensors.

The signal spot size of the sensor beam selected can vary significantly. Generally the smaller the spot size the better. For the first sensor, the preferred size would not exceed the size of the scoring produced on the trim piece by the cutting laser beam. For the second sensor, if surface finish variations, so called grain, are significant, its spot size should preferably not exceed 300 microns.

Figure 2:
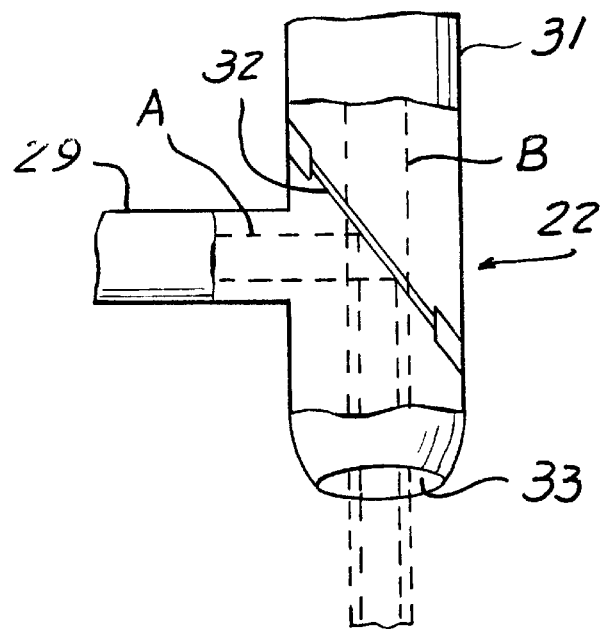

There are numerous ways for combining the separately originated cutting laser beam B and sensor beam A to create collinear segments thereof. FIG. 2 shows the inner details of the beam combining device 22 which combines the separate laser beam A and the first sensor beam B to create collinear segments which impinge the trim piece surface 14. The beam combining device 22 includes a reflector 32 having coatings causing reflection of light of the wavelength of the sensor beam A from its inclined surface while allowing the cutting laser beam B to be transmitted.

Such coated selective reflectors are commercially available. This of course requires that the laser and sensor beams be of different wavelengths.

A side entrance tube 29 directed at the reflector 32 is connected to the first sensor 20. The main tube 31 mounts the reflector 32, main tube 31 having an end opening 33 directed at the trim piece 16.

The segment of the sensor beam A reflected from the reflector 32 is caused to be collinear, i.e., aligned and coextensive with the segment of the laser beam B past the reflector 32, with both collinear segments then impinging the surface 14 at the same precise point.

FIG. 2A shows a second form of a beam combining device 22A having an inclined reflector 32A having coatings causing reflection of a beam having the wavelength of the cutting laser beam B, while allowing transmission of the beam having wavelengths of the sensor beam A to be transmitted therethrough to reverse the relationship shown in FIG. 2.

FIG. 2B is a simplified diagrammatic view of another form of the beam combining device 22B combining the cutting laser beam B and the first sensor beam A to produce collinear downstream segments thereof. This embodiment includes a simple mirror reflector 36 having a through hole 34. The hole 34 is small in diameter relative to the diameter of the cutting laser beam B in order to minimize or eliminate the effect that the presence of the hole 34 may have on reflecting the cutting laser beam B from the mirror reflector 36 to redirect the cutting laser beam B. Such a mirror does not require coatings that are wavelength-selective such as those shown in FIGS. 2 and 2A in order to combine segments of the beams into a collinear relationship. In this particular arrangement, the first sensor 20 could be a CCD camera receiving beams reflected from the trim piece surface being scored by the laser beam.

Figure 4:
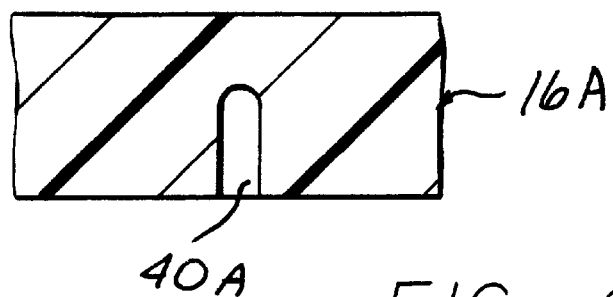
FIGS. 4 through 6 are cross sectional views of sample monolayer and multilayer trim piece constructions on which various types of trim piece weakening scorings have been made.
Figure 5:
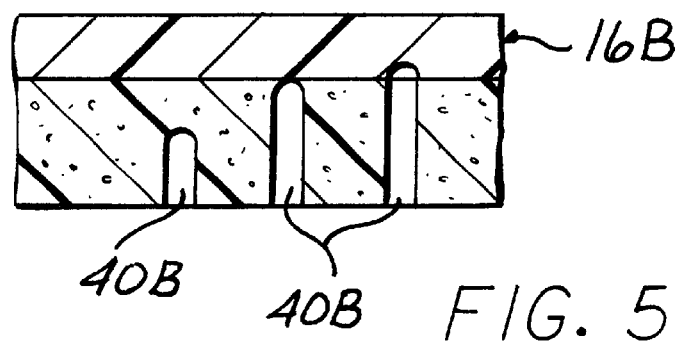
Figure 6:
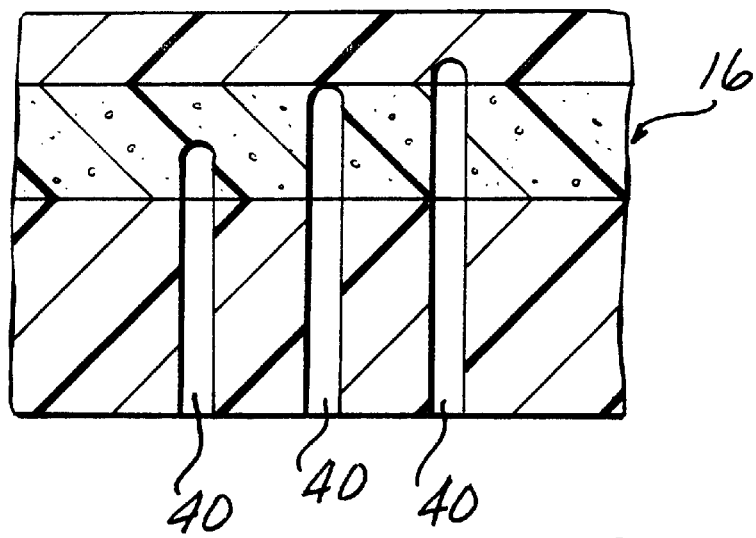

The trim piece can be any of many automotive parts including instrument panels and/or their components (skins, substrates, foams, scrims, etc.), driver side airbag covers, door panels, seat covers, headliners, bumpers and seat belts. The scoring can be applied on either side of the trim piece but is preferably applied from the inside so that is substantially invisible from the outside surface facing the passenger. As shown in FIG. 3, the scoring does not penetrate the outer surface 28 of the trim piece 16 shown as an instrument panel and would be essentially invisible to the passenger. Different materials could be utilized in a trim piece including metals, polymers (TPUs, TPOs, PVC, TPEs, etc.), leather, fabrics, wood and wood composites. As shown in FIGS. 4 through 6, the trim piece 16, 16A, 16B may consist of one or more layers of similar or dissimilar materials. In multilayer constructions, the scorings 40, 40A, 40B could be applied to any one layer or any combination thereof as shown.

Manufacturing of the trim piece can be done in several ways using different materials. Many of these materials can be formed in a solid state or in a cellular state. Polymeric trim pieces can be formed by processes such as extrusion, injection molding, low pressure insert molding, blow molding, casting, thermoforming, lamination and foaming.

The scoring applied can be in any shape, including a U, H, I, T, X, W, S and Y pattern, required to form an opening for the airbag to deploy. The opening could include one or more door panels. The scoring can be either continuous or discontinuous including grooves, blind holes and dashes. Furthermore, the cut orientation can be straight or offset. For successful and consistent airbag deployments, the degree of precision of cutting is particularly important to ensure that the amount of material remaining along the predetermined pattern is as intended.

The penetration or depth of scoring, for an invisible airbag door application, can be up to about 95% of the trim piece thickness.

In order to apply the complete scoring pattern, the trim piece is preferably moved relative to the laser beam and/or the sensors. The relative motion can be applied by a number of motion actuators including robots and X-Y tables. During cutting, the sensor thickness data can also be used to control the movement of the motion device in order to apply the scoring along the predetermined pattern. The trim piece may be held directly by the motion device or be attached to a holding fixture held by the motion device. The holding fixture may be shaped to match the shape of the trim piece and/or be designed to register specific surface features of the trim piece. Vacuum or clamps could also be applied to the holding fixture to hold the trim piece surface in better contact with the fixture 18. The fixture 18 can be designed to allow the second sensor 26 to have physical and/or optical access to the surface 28 of the trim piece (i.e., transparent fixture wall, opening in fixture wall, etc.).

The process controller 30 is designed to control the operation of the laser and/or motion actuator based on the feedback signals provided by the two sensors 20, 26 which, from opposites sides or surfaces of the trim piece 16, monitor the location being scored. The two sensors 20, 26 working in tandem determine the remaining thickness of the trim piece 16 at any point they are directed to. During laser scoring at a given point, the two sensors 20, 26 provide signals from which a measurement of the material thickness remaining after the scoring can be derived by the control device 30. Based on this real-time thickness determination, the control device 30 controls the operation of the cutting beam source 12 to effect only the desired extent of material removal intended for any given point on the trim piece 16. The remaining thickness data can also be used to control the motion actuator 24 to move the trim piece to the next desired location along the predetermined scoring pattern.

Due to the collinearity of the impinging segments of the first sensor beam and the cutting beam, several advantages are realized that could not be attained by any of the existing processes. Since the first sensor beam and the laser beam are always impinging on the same point on the trim piece, the process becomes insensitive to a large number of key variables, including the angle of cutting, the depth of the penetration, the trim piece thickness, the configuration of the weakening pattern and, to a large extent, the speed of cutting. Also, the combination of the two sensors provides for a direct remaining thickness measurement, superior scoring precision and excellent part to part repeatability. In addition, the process enables the user to overcome variations in trim piece thickness, material properties such as density, color, voids and surface grain. These and other benefits are obtained while operating with rapid adaptive control in a single-pass mode.

Figure 7:
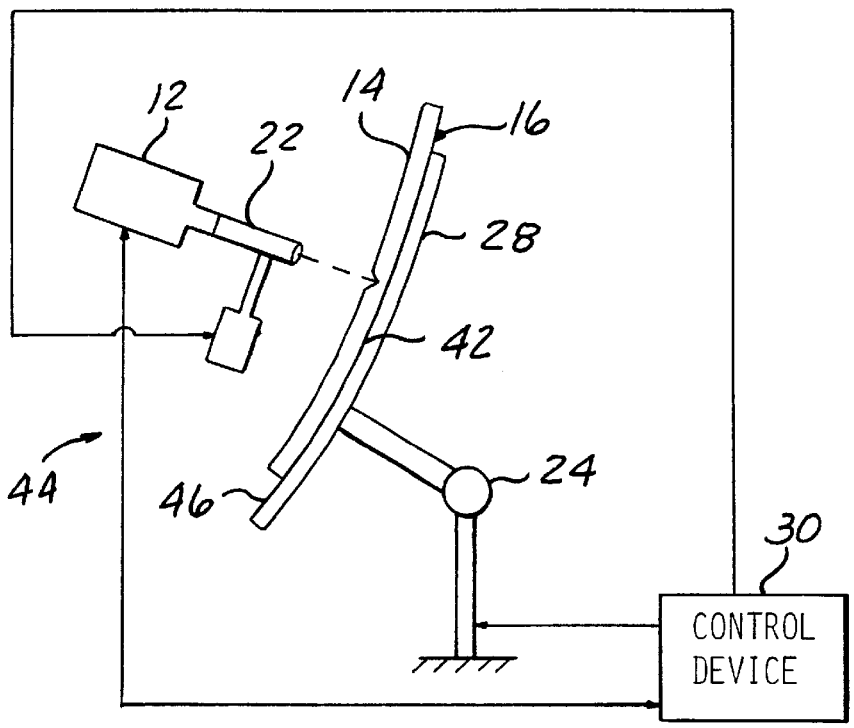
FIG. 7 is a diagrammatic view of one form of the apparatus according to the invention incorporating only a single sensor.

A second embodiment of the apparatus 44 according to the invention is shown in FIG. 7 where the outer surface 42 of the trim piece 16 is in intimate contact with the inner fixture wall 46. In this arrangement, the distance between the first sensor 48 and the fixture inner wall 46, along the predetermined scoring pattern, can be measured prior to starting the scoring operation. If this distance can be maintained constant from pass to pass, then the second outside sensor would not be necessary while still running the process in a single-pass, adaptive control mode.

Figure 8:
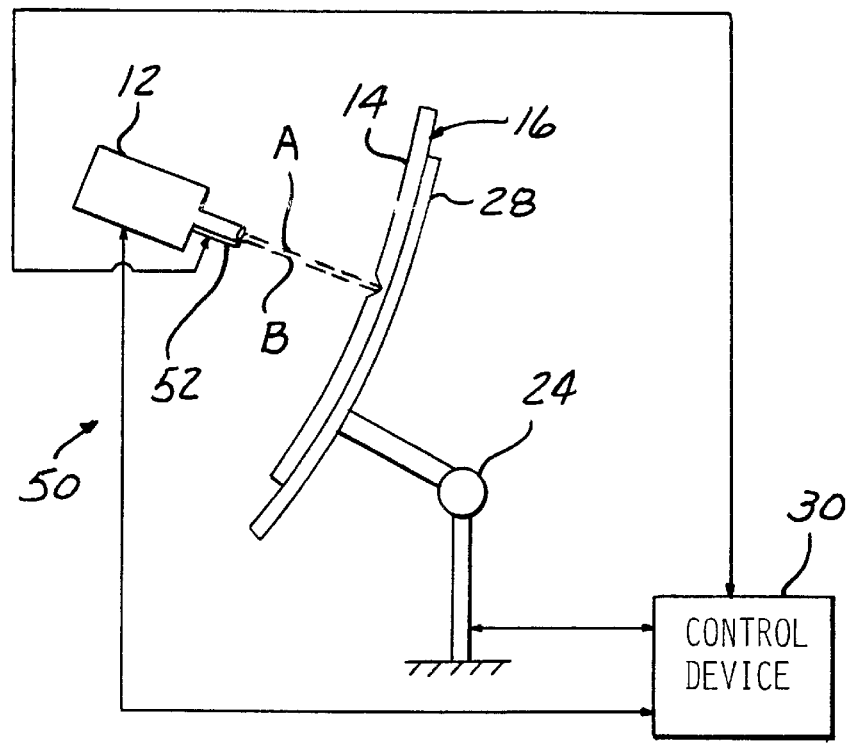
FIG. 8 is a diagrammatic view of a second form of the apparatus according to the invention incorporating only a single sensor.

FIG. 8 shows another embodiment of the apparatus 50 where the first sensor 52 is mounted immediately alongside the cutting beam source 12 so that both beams A, B are substantially collinear with each other to approximate the effect of using the beam combining device 22 described.

The laser cutting beam may also function as the sensor. This arrangement also maintains the collinear configuration as the sensing signals and the laser beam are generated by the same laser. Under this approach, the laser beam characteristics and control would be manipulated to conduct sensing measurements during or between cutting intervals (i.e., sensing after a preset number of cutting pulses).

What is claimed is:

1. A process for forming lines of weakness in an automotive trim piece covering an airbag installation, said airbag installation including an airbag adapted to be inflated and deployed upon detection of a collision, said weakening enabling formation of an air bag deployment door opening, said trim piece having at least one layer, comprising the steps of:

scoring a surface of the trim piece by directing a cutting beam from a cutting beam source onto to said surface and moving said trim piece relative to a source of said cutting beam in a predetermined scoring pattern;

monitoring the scoring effect produced by said cutting beam by sensor beams produced from a first sensor and a second outer sensor respectively located on opposite sides of said trim piece and directed towards the trim piece location being scored by said cutting beam, said first sensor located on the same side of said trim piece as said cutting beam source;

combining said first sensor sensing beam with said cutting beam so that combined respective segments are collinear with each other when impinging said trim piece surface so as to be continuously directed at the same points along said scoring pattern;

controlling the extent of material removed by said cutting beam at each point along said predetermined pattern by controlling said scoring in correspondence with feedback signals generated by said first and second sensors during said scoring; and, moving said trim piece relative to said cutting beam to score said trim piece along said predetermined scoring pattern.

2. The process according to claim 1 wherein said cutting beam is a laser.

3. The process according to claim 1 wherein said cutting beam source is an ultrasonic generator.

4. The process according to claim 1 wherein said feedback signals provided by said first and second sensors together correspond to the material thickness remaining at each trim piece point being scored.

5. The process according to claim 1 wherein said trim piece is held in a fixture shaped to provide intimate contact with the outer surface of said trim piece.

6. The process according to claim 1 wherein said feedback signals produced from said sensors are used to also control the relative movement of the trim piece and scoring beam.

7. A process for forming lines of weakening in an automotive trim piece covering an airbag installation, said airbag installation including an airbag adapted to be inflated and deployed upon detection of a collision, said lines of weakening enabling formation of an air bag deployment door opening, said trim piece having at least one layer, comprising the steps of:

scoring a surface of said trim piece by directing a cutting beam at said inside surface from a cutting beam source, and relatively moving said trim piece and said cutting beam source in a predetermined scoring pattern after loading said trim piece onto a fixture where a surface of said trim piece is in contact with a surface of said fixture;

monitoring the extent of scoring effected by said cutting beam by feedback signals produced by a sensor located on the same side of said trim piece as said cutting beam source, said sensor having a sensor beam directed at said trim piece surface to be scored;

combining said sensor beam and said cutting beam so as to have collinear segments thereof impinging said surface so that both beams impinge the same points on said trim piece;

controlling the level of said scoring effected by said cutting beam at each point along said predetermined pattern in accordance with said feedback signals provided by said sensor; and, moving said trim piece relative to said scoring beam to score said trim piece along said predetermined scoring pattern.

8. The process according to claim 7 wherein said cutting beam source is a laser beam source.

9. The process according to claim 7 wherein said sensor beam is electromagnetic radiation of a different wavelength than said cutting beam which is also electromagnetic, and in said combining step, said sensor and cutting beams are both directed at a reflector which selectively transmits one beam and reflects the other as a result of the difference in wavelengths to cause segments of said respective beams to be collinear.

10. The process according to claim 9 wherein said reflector is inclined at 45° and in said combining step one beam is directed at a front face to be reflected and the other beam is directed at a rear face of said reflector through which it is transmitted.

11. The process according to claim 7 wherein said sensor beam is of much smaller diameter than said cutting beam and wherein in said combining step said cutting beam is directed at an inclined reflector surface having a hole formed therein much smaller than said cutting beam, and said sensor beam is directed through said hole in a direction collinear to said cutting beam after being reflected from said reflector.

12. A process for weakening an automotive trim piece covering an airbag installation, said airbag installation including an airbag adapted to be inflated and deployed upon detection of a collision, said weakening enabling formation of an air bag deployment door opening, said trim piece having at least one layer, comprising the steps of:

scoring an inside surface of the trim piece by directing a cutting beam from a cutting beam source onto said inside surface and relatively moving said trim and said cutting beam in a predetermined pattern;

controlling the level of said scoring effected by said scoring beam at each point along said predetermined pattern; and, monitoring the scoring produced by said scoring beam with feedback signals from a sensor located on the same side of said trim piece as the said cutting device, said sensor having a sensing beam combined in a collinear relationship with said cutting beam and continuously impinging the same point on said trim piece as the cutting beam.

13. The process according to claim 12 wherein said cutting beam source is a laser beam source.

14. The process according to claim 12 wherein said cutting beam source is an ultrasonic generator.

15. The process according to claim 12 wherein said trim piece is attached to a fixture shaped to provide intimate contact with an outer surface of said trim piece.

16. A process for weakening an automotive trim piece covering an airbag installation, said airbag installation including an airbag adapted to be inflated and deployed upon detection of a collision, said weakening enabling formation of an air bag deployment door opening, said trim piece having at least one layer, comprising the steps of:

scoring an inside surface of the trim piece by directing a cutting beam at said inside surface and relatively moving said trim piece and said cutting beam in a predetermined scoring pattern;

controlling the level of said scoring effected by said cutting beam at each point along said predetermined pattern; and, monitoring the extent of scoring effected by said cutting beam by feedback signals produced from a sensor located on the same side of said trim piece as said cutting beam, said sensor located next to said cutting beam and directing a sensing beam at said trim piece, said sensor beam collinear with said cutting beam.

17. The process according to claim 16 wherein said cutting beam is a laser beam.

18. The process according to claim 16 wherein said cutting beam is a beam of ultrasonic waves.

19. The process according to claim 16 wherein said trim piece is held on to a fixture shaped to provide intimate contact with the outer surface of said trim piece.

* * * * *

UNITED STATES PATENT AND TRADEMARK OFFICE
CERTIFICATE OF CORRECTION

PATENT NO. : 6,423,933 B2
DATED : July 23, 2002
INVENTOR(S) : Antonios Nicholas et al.

It is certified that error appears in the above-identified patent and that said Letters Patent is hereby corrected as shown below:

Column 33,
Line 30, delete "scorning" and insert therefor -- scoring --.

Column 4,
Line 53, delete "A" and insert therefor -- B --.
Line 53, delete "B" and insert therefor -- A --.

Column 5,
Line 60, delete "return".

Column 6,
Line 53, delete "48" and insert therefor -- 20 --.

Column 8,
Line 31, after "cutting beam" insert -- , --.
Line 32, after "combining step" insert -- , --.

Signed and Sealed this

Ninth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,423,933 B2
DATED : July 23, 2002
INVENTOR(S) : Antonios Nicholas et al.

It is certified that error appears in the above-identified patent and that said Letters Patent is hereby corrected as shown below:

Column 3,
Line 31, delete "scorning" and insert therefor -- scoring --.

Column 4,
Line 53, delete "A" and insert therefor -- B --.
Line 53, delete "B" and insert therefor -- A --.

Column 5,
Line 60, delete "return".

Column 6,
Line 53, delete "48" and insert therefor -- 20 --.

Column 8,
Line 31, after "cutting beam" insert -- , --.
Line 32, after "combining step" insert -- , --.

This certificate supersedes Certificate of Correction issued November 9, 2004.

Signed and Sealed this

Fifteenth Day of February, 2005

JON W. DUDAS
*Director of the United States Patent and Trademark Office*